Figure 1:
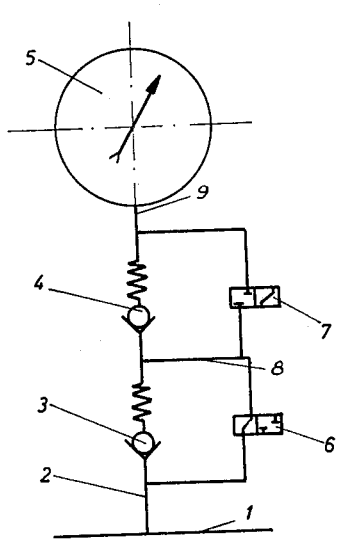

United States Patent Office 3,233,462
Patented Feb. 8, 1966

3,233,462
DEVICE FOR THE INDICATION OF EXTREME VALUES OF PULSATING HYDRAULIC PRESSURES
Johannes Kuter, Dusseldorf, Altenberg, and Bodo Missmahl, Dusseldorf-Lohausen, Germany, assignors to Losenhausenwerk Dusseldorfer Maschinenbau AG., Dusseldorf, Germany
Filed May 13, 1963, Ser. No. 279,996
Claims priority, application Germany, May 16, 1962, L 41,996
8 Claims. (Cl. 73—396)

The present invention relates to an apparatus for the continuous measurement of maximum or minimum pressures in a pulsating hydraulic system.

For the indication of extreme values of pulsating hydraulic pressure as for example with hydraulic material testing machines it is known to periodically connect a manometer to the measuring pressure chamber via a controlled valve such as a rotating slide valve. The rotating slide valve is actuated synchronously with the occurrence of the respective maximum or minimum pressure to connect the measuring pressure chamber with the manometer. A static pressure thus exists in the connection line from the rotating slide valve to the manometer, which pressure corresponds to the maximum or to the minimum, respectively, of the pulsating pressure prevailing in the measuring pressure chamber, with indication thereof at the manometer.

These known rotating slide valve arrangements suffer from various drawbacks. They require the position of the maximum and the minimum, respectively, of the pulsating pressure to be known exactly so that the rotating slide valve may be operated accordingly. Such slide valves often are used with hydraulic material-testing machines where a pulsating or alternating load is produced by means of a pulsator, since the rotating slide valve may then be actuated synchronously with the pulsator. Here too, however, frequency-dependent variations of the pressure course of the pulsator stroke may occur due to the mass forces. At any rate, even in such installations the rotating slide valve must be very accurately adjusted so that the maxima and the minima, respectively, of the pulsating pressure are always correctly obtained. However, there are also installations where the position of the extreme values is not known at all or not detectable. In such cases, a rotating slide valve arrangement of the aforementioned type is not suitable at all.

An arrangement is known wherein the manometer is connected to the measuring pressure chamber via a check valve (German specification 819,729). With the check valve being arranged to permit flow toward the manometer a pressure exists at the manometer behind the check valve, which pressure corresponds to the maximum of the pulsating pressure in the measuring pressure chamber. However, since the manometer must also follow decreasing maximum pressures in the measuring pressure chamber, a pressure balancing means is provided in parallel with the check valve. This pressure balancing means forms a restricted channel through which the oil from the manometer may slowly bleed off so that the oil pressure at the manometer will drop at such times as it is already greater than the pressure in the measuring chamber. Of course, at such times no new oil is supplied to the manometer via the check valve. In further modification of this arrangement it is also know to connect a maximum and a minimum manometer to the measuring pressure chamber by way of check valves, of which one opens towards the manometer and the other towards the measuring pressure chamber (German specification 1,047,481). To enable a follow-up of the manometers with decreasing maximum pressure or increasing minimum pressure, the two manometers are communicated with each other by way of a restricted connection line in this known arrangement.

In practice, these known arrangements offer difficulties, as the throttling effect of the pressure balancing means is dependent on the viscosity of the oil (or other pressure medium). In the case of substantial throttling, the pressure medium only bleeds off rather slowly from the manometer, or to the manometer, so that the manometer is unable to follow rapid changes of the extreme values, particularly if the pressure medium is cold. If, however, the throttling is reduced to increase the bleeding rate, an error of measurement may occur due to an increased volume of oil flowing through the throttle and perhaps even pulsating through the throttle, with a heating of the oil and accordingly reduced viscosity.

It is the object of the present invention to avoid the shortcomings of the known arrangements, as described. According to the invention, this object is attained by providing that the pressure balancing means contain two valves opening and closing alternately. The first valve establishes a pressure balance between measuring pressure chamber and an auxiliary pressure chamber arranged behind the check valve. The second valve establishes a pressure balance between the auxiliary pressure chamber and the manometer.

The pressure balance means permits a follow-up of the manometer with decreasing maximum pressure and increasing minimum pressure, respectively. In the present invention this follow-up is not effected by a throttle the flow resistance of which is dependent on the viscosity of the pressure medium and therefore varies, for instance, with the temperature. In contrast the pressure balance is achieved by valves which periodically completely open so that fully defined conditions are obtained, independent of the viscosity of the pressure medium.

It is not possible merely to periodically by-pass the check valve connecting the manometer with the measuring pressure chamber by means of a controlled valve. Then, with each opening of the controlled valve the pressure at the manometer would decrease and increase, respectively, to the measuring pressure prevailing at that very moment of opening (depending on whether a maximum or a minimum manometer is involved). After the controlled valve was closed, the manometer pressure would increase or decrease to the new extreme value by way of the check valve. However, it is undesirable to require the opening of the controlled valve in timed relationship to the occurrence of the pressure variations. To do so would present the synchronizing disadvantages of the known rotating slide valve, and the manometer indication would vibrate in the rhythm of the valve actuation. Therefore, in the present invention a kind of "pressure floodgate" or pulsation absorber is provided. In a first phase, an auxiliary pressure chamber arranged behind the check valve is brought to a pressure below the maximum pressure or above the minimum pressure (depending on whether maximum or minimum readings are being taken) by the opening of the first controlled valve which is in parallel with the check valve. If maximum readings are being taken the check valve permits flow toward the manometer. The check valve is connected to permit flow away from the manometer when minimum readings are to be taken. Therefore, the pressure in the auxiliary pressure chamber again increases to the maximum value, or decreases to the minimum value by way of the check valve after the controlled valve is closed. In a second phase, the pressure prevailing in the auxiliary pressure chamber becomes effective at the manometer. Prior to the first phase the manometer was subjected to the pressure that existed during the preceding pressure pick-off. After the second phase it now reads the new pressure in the auxiliary pressure chamber, that differs only relatively little from the preceding one. Accordingly, the manometer follows the maximum and the minimum pressure, as the case may be, upwards as well as downwards, with no vibrations occurring. The arrangement may also be of a type, where a second check valve is arranged in series with the first check valve, which second check valve is in parallel to the second controlled valve in connecting the auxiliary pressure chamber to the manometer, so that a pressure rise at the maximum manometer and a pressure drop at the minimum manometer, respectively, is directly acting on the manometer by way of this check valve.

With hydraulic material-testing machines it is customary to have one manometer each for maximum and for minimum indications. Utilizing the present invention, a first manometer (maximum manometer) with the check valve opening towards the manometer is provided for maximum indication and a second manometer (minimum manometer) with a check valve opening towards the measuring pressure chamber is provided for minimum indication. In combination with these check valves, one controlled valve each is connected in parallel with each check valve. However, provision may also be made that the auxiliary pressure chambers of maximum and minimum manometer are communicated with each other by means of a controlled valve. Thus, one controlled valve is economized as compared to the first-mentioned arrangement. The two valves between the auxiliary pressure chambers and manometers may open simultaneously and the valve positioned between the auxiliary pressure chambers may open successively.

The opening frequency of the controlled valves may be synchronized with the expected rate of change of the extreme (maximum and minimum) pressure values and need not correspond to the frequency of the pressure pulsations. The opening frequency may rather be substantially smaller, a fact which is advantageous with high pulse frequencies of the load. Also the opening of the valves need not take place in a definite timed relationship to the pressure pulsations, so that no errors may occur through false adjustment (lack of synchronism) of rotating slide valves or the like.

Figure 2:
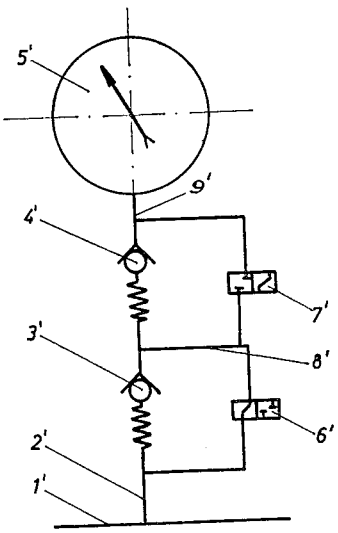
Figure 3:
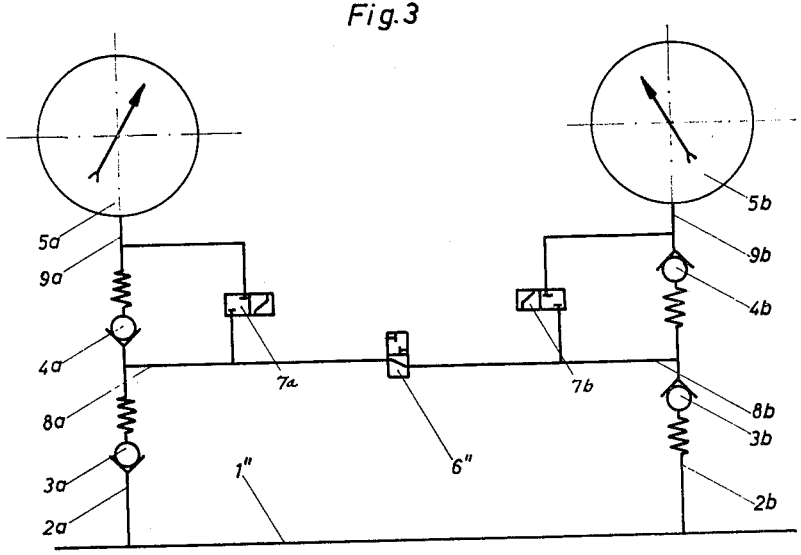

A few embodiments of the invention are presented in the drawings and described as follows:

FIG. 1 is a schematic illustration of an embodiment for the indication of pressure maxima;

FIG. 2 similarly illustrates an embodiment for the indication of pressure minima, and FIG. 3 schematically illustrates an embodiment by means of which pressure maxima as well as pressure minima are indicated.

Reference numeral 1 (FIG. 1) designates a line wherein a pulsating oil pressure is existing, the maximum of which pressure is measured. To do this, line 1 connects to a manometer 5 by way of a line 2, the two check valves 3 and 4 arranged in series and line 9. Controlled valves 6 and 7, respectively, such as mechanically powered rotating slide valves or electrically actuated solenoid valves, are connected in parallel with the check valves 3 and 4 respectively. The valves 6 and 7 are actuated so as to open alternatingly.

Upon the opening of valve 6, with valve 7 being closed, the pressure in the auxiliary pressure chamber 8, behind check valve 3, adapts to that pressure which prevails in the measuring pressure line 1 at that instant. In most instances, this pressure is lower than the maximum pressure or at best equal thereto depending upon the timing of the opening of valve 6 with respect to the occurrence of the maximum pressure in line 1. Assuming that valve 6 was not open at the occurrence of the maximum pressure in line 1, then when that maximum pressure does occur (after valve 6 has been closed) the pressure in chamber 8 will rise to that maximum. This of course is caused by the fact that the pressure in line 1 rises to the maximum value and forces open the check valve 3 opening towards the manometer 5. In either event chamber 8 will assume a pressure corresponding to the maximum pressure in line 1. If there is a rise of the maximum pressure, then this increasing pressure appearing in chamber 8 is directly transmitted into the pressure line 9 to manometer 5 by the opening of check valve 4. If the maximum pressure appearing in chamber 8 is less than the pressure then existing in line 9 a pressure balancing thereafter is effected between chambers 8 and 9 by the opening of valve 7 (which occurs as valve 6 is closed).

Thus, there is a periodic pick-off of the pressure in line 1. The pressure in the auxiliary pressure chamber 8 is periodically reduced to a smaller value through opening of valve 6 and then builds up again to the prevailing maximum value by way of check valve 3. The new maximum value then is transmitted to manometer 5 by way of check valve 4 or controlled valve 7. Thereby, the pressure at the manometer does not follow the pressure drop as when valve 6 is opened. The pressure differences between chambers 8 and 9, in accordance with the maximum pressure during the present and the preceding pick-off, are generally small. The manometer indication changes smoothly and evenly to provide a continuous reading of the prevailing maximum pressure in line 1.

FIG. 2 shows a similar arrangement for the measurement of minimum pressures. Corresponding parts in FIG. 2 are affixed with a prime (') so as to distinguish them from those in FIG. 1. The arrangement according to FIG. 2 only differs from that of FIG. 1 in that both check valves 3' and 4' are reversed as to the direction of flow therethrough. Instead of permitting flow from line 1 toward the manometer as in FIG. 1, they only permit flow in the direction of away from the manometer and toward line 1.

With a descreasing minimum pressure in line 1', the new minimums will be reflected in chamber 8' by the operation of check valve 3'. To follow increasing minimum pressures in line 1' the action of controlled valve 6' again comes into play. When valve 6' opens (valve 7' being closed) the pressure in line 1' will be equal to or greater than the new minimum pressure in line 1. If it is equal to the new minimum, that new minimum will be transmitted to chamber 8'. If it is greater than the new minimum, that greater pressure appears in chamber 8'. However, this has no effect on manometer 5' because valve 7' is closed and the check valve 4' prevents flow. As valve 6' closes and the pressure in line 1' does change to its new minimum, the excess pressure in chamber 8' dissipates by fluid flow back through check valve 3' to line 1'. Chamber 8' now assumes a pressure corresponding to the new minimum pressure in line 1'. Valve 7' opens to permit manometer 5' to read this new increased minimum pressure in chamber 8'. Of course, if the new minimum pressure in chamber 8' is decreased, this is transmitted to manometer 5' through the actuation of check valve 4'.

In FIG. 3, two manometers 5a and 5b are provided for maximum and minimum indication respectively. The arrangement basically corresponds to that in FIGS. 1 and 2, and corresponding parts are denoted by the same characters as therein, but with the suffix "a" and "b," respectively. Instead of the two controlled valves 6 and 6' of FIG. 1 and FIG. 2, however, only one single controlled valve 6'' is provided which connects the two auxiliary pressure chambers 8a and 8b with each other. When valve 6'' opens, a common mean pressure is established in the two auxiliary pressure chambers 8a and 8b. Since chamber 8a previously was at a maximum and chamber 8b was at a minimum, the resulting pressure in chamber 8a is below the maximum and in chamber 8b it is above the minimum. Upon the closing of valve 6'', the pressure in chamber 8a builds up to the maximum pressure by way of check valve 3a. The pressure in chamber 8b drops down to the minimum pressure by way of check valve 3b. The resulting pressures in the auxiliary pressure chambers 8a and 8b are then transmitted to the manometers 5a and 5b respectively by way of the check valves 4a and 4b are the controlled valves 7a and 7b.

We claim:

1. In an apparatus for reading an extreme value of a pulsating hydraulic pressure in a measuring chamber wherein a manometer is connected to the measuring pressure chamber by a check valve arranged to permit flow in one direction between the manometer and chamber, the improvement comprising: a pair of alternately opening controlled valves; an auxiliary pressure chamber; and means connecting the manometer to the auxiliary chamber through one of said controlled valves and connecting the measuring chamber to the auxiliary chamber through the check valve and the other controlled valve in parallel.

2. In an apparatus as set forth in claim 1, and including a second check valve connected in parallel to said one controlled valve and arranged to permit flow in the same direction as the first check valve.

3. An apparatus for reading an extreme maximum value of a pulsating hydraulic pressure in a measuring chamber, said apparatus including: a manometer; an auxiliary chamber; a first check valve connecting the manometer and the auxiliary chamber and a second check valve connecting the auxiliary chamber and the measuring chamber, said check valves being arranged to permit fluid flow therethrough only in the direction of from the measuring chamber to the manometer; and means connected to said pressure chamber and including a controlled valve connected in parallel with the first check valve and periodically opened and closed, said means also connecting said chamber to a source of fluid at a pressure no greater than the then existing extreme maximum pressure in the measuring chamber, said connection to said source being made in the intervals when the controlled valve is closed.

4. An apparatus as set forth in claim 3, wherein the period of opening and closing the controlled valve is longer than the pulsating period of said hydraulic pressure.

5. An apparatus for reading an extreme minimum value of a pulsating hydraulic pressure in a measuring chamber, said apparatus including: a manometer; an auxiliary chamber; a first check valve connecting the manometer and the auxiliary chamber and a second check valve connecting the auxiliary chamber and the measuring chamber, said check valves being arranged to permit fluid flow therethrough only in the direction of from the manometer to the measuring chamber; and means connected to said pressure chamber and including a controlled valve connected in parallel with the first check valve and periodically opened and closed, said means also connecting said chamber to a source of fluid at a pressure no smaller than the then existing extreme minimum pressure in the measuring chamber, said connection to said source being made in the intervals when the controled valve is closed.

6. An apparatus as set forth in claim 5, wherein the period of opening and closing the controlled valve is longer than the pulsating period of said hydraulic pressure.

7. An apparatus for reading an extreme maximum value of a pulsating hydraulic pressure in a measuring chamber, said apparatus including: a manometer; an auxiliary chamber; a first check valve connecting the manometer and the auxiliary chamber and a second check valve connecting the auxiliary chamber and the measuring chamber, said check valves being arranged to permit fluid flow therethrough only in the direction of from the measuring chamber to the manometer; and means connected to said pressure chamber and including a controlled valve connected in parallel with the first check valve and periodically opened and closed, said means also connecting said chamber to a source of fluid at a pressure no greater than the then existing extreme maximum pressure in the measuring chamber, said connection to said source being made in the intervals when the controlled valve is closed; a manometer; an auxiliary chamber; a first check valve connecting the manometer and the auxiliary chamber and a second check valve connecting the auxiliary chamber and the measuring chamber, said check valves being arranged to permit fluid flow therethrough only in the direction of from the manometer to the measuring chamber; and means connected to said pressure chamber and including a controlled valve connected in parallel with the first check valve and periodically opened and closed, said means also connecting said chamber to a source of fluid at a pressure no smaller than the then existing extreme minimum pressure in the measuring chamber, said connection to said source being made in the intervals when the controlled valve is closed.

8. An apparatus for reading an extreme maximum value of a pulsating hydraulic pressure in a measuring chamber, said apparatus including: a first manometer; a second manometer; first and second auxiliary chambers; a first check valve connecting the first manometer to the first auxiliary chamber and a second check valve connecting the first auxiliary chamber to the measuring chamber, said check valves being connected to only permit fluid flow in the direction of from measuring chamber to the manometer; a third check valve connecting the second manometer and the second auxiliary chamber and a fourth check valve connecting the second auxiliary chamber to the measuring chamber, said third and fourth check valves being connected to permit fluid flow only in the direction of from the second manometer to the measuring chamber; and means including a first controlled valve, which is opened and closed periodically, a second controlled valve opened and closed concurrently with the first controlled valve, and a third controlled valve opened and closed alternately with the first and second controlled valves, said first controlled valve being connected in parallel with the first check valve, said second controlled valve being connected in parallel with the third check valve, said third controlled valve connecting said two auxiliary chambers.

No references cited.

DAVID SCHONBERG, *Acting Primary Examiner.*

LOUIS R. PRINCE, *Examiner.*

D. O. WOODIEL, *Assistant Examiner.*